Patented Apr. 5, 1949

2,466,050

UNITED STATES PATENT OFFICE 2,466,050

PROCESS OF HYDROCARBON CONVERSION WITH A PRETREATED MONTMORILLONITE CLAY CATALYST

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,425

12 Claims. (Cl. 196—52)

The present invention relates to the catalytic conversion of hydrocarbons such as fractions obtained or derived from petroleum or other carbonaceous or hydrocarbonaceous materials, and is particularly concerned with such conversion processes in which a cracking catalyst can be employed, as for instance in promoting scission of carbon to carbon linkages or in the typical reactions occurring in the reformation of liquid products in the boiling range of motor fuel.

It has heretofore been proposed to employ as contact masses in catalytic conversion of hydrocarbons certain natural earths and clays. Very few of such materials that have been tried in cracking, reforming or related reactions have been found appropriate for the purpose, since in many instances catalysts formed therefrom were found to be substantially inert, or had a tendency to promote excessive deposition of coky substance which is not only undesirable on its own account, but such deposit also effects rapid decline in catalytic activity, necessitating frequent regeneration after comparatively short on stream operation.

The value of a contact material as a catalyst in the processes referred to is dependent upon its capability of selectively forming from the charge stock optimum quantities of desired liquid hydrocarbons such as products useful as motor fuel, with a minimum production of gas and coke. For instance, a contact material which is relatively inert catalytically, such as diatomaceous earth or kieselguhr, when attempted to be used in a cracking operation, yields products varying but little in quality and quantity from those obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are not ordinarily useful or desirable as cracking or reforming catalysts.

Among the natural adsorptive materials which are either substantially inert or otherwise impractical as hydrocarbon conversion catalysts, because they produce large quantities of coke and/or gas compared to the gasoline yield, there are certain clays which can be activated by known methods, such as acid treatment, to produce catalysts of acceptable quality. Many available clays, however, do not respond to the usual methods of activation to produce catalysts of acceptable activity level, and are therefore regarded as unsuitable for commercial use as cracking or reforming catalysts.

Naturally occurring clays ordinarily contain besides the principal compounds and complexes of silica and alumina, lesser proportions of compounds of iron, calcium, magnesium, etc. Others also may include among their lesser components, compounds of zirconium or titanium. In the selection of natural adsorptive materials for use as catalysts, it has previously been observed in U. S. Patent 2,078,945 of Eugene J Houdry, that the content of iron compounds has a critical relation to the capacity of the contact mass for regeneration without extensive loss in catalytic activity. The patent indicates that contact masses suitable for use as catalysts should not contain over 3% of iron oxide.

Although a large part of the iron compounds occurring in or as components of many clays are present in such form that they can be largely removed therefrom as for instance by conventional acid treatment, such procedures result, as in the prior art activatable bentonite-type clays employed as catalysts, in products still containing in the order of about 1.5% or more of iron determined as ferric oxide. Acid treatment also removes portions of the aluminum content of the clay so that if the clay residue is to be used for purposes where aluminum content is an important consideration, as for catalyst manufacture, the extent of the treatment must accordingly be limited. Thus, on repeated or more drastic treatments, additional quantities of iron compounds may be removed but the products so obtained become increasingly impaired in physical properties and because of accompanying extraction of comparatively large quantities of aluminum compounds, the treatment provokes a marked decline in catalytic activity, eventually resulting in products of such reduced catalytic activity that they are no longer useful for that purpose. Although it is not desired to be bound by any scientific explanation, there is reason to believe that the less readily removable iron components of argilloferruginous clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that portions or all of the more tenaciously held iron components may vary in form from that of the principal components of the clay structure.

In our copending applications Serial Nos. 644,421; 644,422; 644,423; and 644,424, filed of even date herewith, there are disclosed special methods of treatment whereby the iron content of argilloferruginous materials can be materially reduced beyond the point obtained by conventional clay activation, and other properties of the materials are changed. By the methods therein described, active cracking catalysts of unique properties are obtained by removing the major part of that portion of the iron which cannot be selectively extracted by acid treatment without accompanying removal of alumina and impairment otherwise of catalytic activity.

The new catalysts obtained by the described methods are characterized by important differences in physical properties that cannot be attributed entirely to their reduced iron content and accordingly certain structural changes are believed to have taken place as a result of the described novel treatment of the clay. For instance, the new products no longer shrink materially at high temperatures (1600° F.), withstand higher temperatures without substantial depreciation in catalytic activity, and demonstrate a distinguishing X-ray pattern. Besides the new catalysts generally have a characteristic difference in color being whiter or lighter than the natural clays from which they are prepared, and notable differences in spectograms are also observed.

In accordance with the present invention, hydrocarbon conversion processes are carried out using as catalysts modified clays which are characterized by novel and advantageous properties distinguishing them from clay catalysts which have been proposed for use in such processes. The hydrocarbon conversion processes with which the invention is concerned are of the type in which clays or other cracking catalysts are employed. The catalysts used in these processes in accordance with the invention are clays which have been modified so as to possess improved properties such as reduced coke and gas production, stability to the deactivating effect of sulfur stocks, resistance to shrinkage and loss of porosity at elevated temperatures, increased gasoline production and the like. These modified clays are further characterized by an exceptionally low iron content while the silica-alumina ratio in their composition may not be substantially different from that of the clay material subjected to a modifying treatment as hereinafter described. The more tenaciously bound iron in the clay has been removed in the modified catalysts in addition to the iron normally extractable by conventional acid activation. The clay catalysts for use in the practice of the invention can be prepared by the methods described in the applications referred to above or by methods described below.

Thus, the catalysts employed in accordance with the present invention demonstrate an unexpectedly low initial coke make on heavy and sulfur stocks, and a surprising resistance to "abnormal aging" and deterioration by highly corrosive charge stocks, on continued use. The weight ratios of gasoline/coke and gasoline/gas on lighter charge stocks may be substantially improved, and in fact, the present catalysts have in many instances demonstrated surprisingly better gasoline/gas ratios than commercial synthetic catalysts. The present catalysts are capable of withstanding more severe conditions and higher regeneration temperatures in practical operation which considered together with an indicated longer useful life of the catalyst and significantly improved yields of desired cracked products, constitute important economic advantages in addition to that afforded consequent to the use of readily available and inexpensive raw materials. Moreover, it is now made possible to operate more efficiently and economicaly with sulfur-containing and other corrosive stocks which rapidly deteriorate ordinary clay catalysts.

As the iron content of the clay is reduced as herein described the catalyst prepared therefrom is progressively improved in properties and the important advantages indicated above become emphasized by the structural modifications which are thought to take place coincidentally with or as a result of the freeing of the isomorphous iron. The various steps of the process, however, should be controlled to minimize accompanying removal of alumina, particularly in clays having a comparatively low original content of alumina. Marked improvement in catalytic properties of the clay catalysts with progressively iron removal appears generally when the content of iron compounds is reduced to about that corresponding to 0.4% $Fe_2O_3$ (by weight) although catalysts of still lower iron content are preferred as those having less than about .3% $Fe_2O_3$ and for corrosive stocks particularly, best results are obtained with catalysts having a content of iron compounds corresponding to less than .2% $Fe_2O_3$ (percentages on dry basis).

The modified catalysts having the advantageous properties and characteristics set forth above can be obtained by treating the clay to convert the iron components present to acid soluble form, for example, soluble salts, including that portion of the iron which is present in a form not efficiently and selectively removable by acid leaching, whereby the iron is made available for subsequent removal such as by a mild acid treatment and/or washing or in some instances by volatilization. In accordance with a preferred embodiment, the clay or earth is subjected in substantially dry form to treatment with a chemically reactive gas or vapor at elevated temperature. The selected reagent is one furnishing a salt forming reactant capable of forming a salt with the iron released thereby. In terms of the theory above set forth, although it is not desired to be bound thereby, there is reason to believe that the iron present as a silicon complex or otherwise forming a part of the lattice structure as by addition to or proxy for other principal cations of the pattern, is converted by the high temperature gas or vapor treatment to simpler or more reactive compounds such as salts which are soluble in and/or react with the acid that may be employed in subsequent leaching. For instance, it has been observed that on treatment of "Filtrol" clay (a commercial acid activated montmorillonite) at high temperature with a gas or vapor of the type described, the obtained clay product on subsequent exposure to oxidizing conditions exhibits a red coloration characteristic of ferric oxide, which is not formed upon oxidation of untreated "Filtrol" clay. Observation of the properties and characteristics of the novel catalysts leads consistently to the view that by the selective removal of iron compounds, as described, new molecular channels may be formed in the clay evenly distributed throughout its mass, effecting consequent increased and uniform adsorptivity.

The treatment with the gas or vapor at elevated temperature may be preceded and/or followed by a wet treatment with mineral acid or an organic acid which forms soluble iron salts or complexes, including lower aliphatic carboxylic acids such as oxalic and acetic as well as hydroxy acids including lactic and the so-called sugar acids. Where the acid treatment precedes, the more available iron compounds (e. g., outside of the lattice structure) are converted to soluble iron salts which are removed as in the known acid activation of bentonites and the residual iron component (e. g., chemically combined in the lattice) thereafter can be acted upon more readily by the gaseous treating agents. Acid treatment following the dry gaseous treatment is effective in assisting the removal of products formed by the reaction of the gaseous agents with the complex or otherwise less available residual iron components. It will be readily understood, therefore, that it may be desirable to employ an acid treatment both before and after the gas or vapor treatment at elevated temperature.

In the production of a catalyst, in accordance with the preferred embodiment, a mild acid pretreatment is desirable to remove superficial impurities and with a clay of the montmorillonite group such as an acid activatable bentonite, the initial acid pretreatment is particularly advantageous, since the otherwise poor porosity of the clay impedes penetration by the gaseous or vapor treating agent. Generally with kaolin type clays acid pretreatment is less significant although with some types of kaolin clays acid pretreatment will also be found beneficial. The preliminary acid treatment may be effected by known processes such as are employed in the art for "acid activation" in the manufacture of decolorizing clays. For instance, the acid treatment may be carried out on the clay in finely divided form while the clay is suspended in water as in the nature of a slurry, to which a concentrated acid such as hydrochloric or sulfuric is added, or dilute acid may be added directly to the finely divided clay. In either case the ratio of acid to clay is preferably in the order of about 30 to 40%. The mixture of clay and acid is preferably heated to about 160° to 210° F. for a period of two to twelve hours, thereafter washed with water and filtered. If desired, the clay may at this point be washed free of acid ions with accompanying extraction of soluble metal salts. The acid treated clay with or without purification by washing may then be dried in any known or desired manner. More concentrated or larger proportions of acid may be employed and/or higher temperatures including increased pressures, or longer periods of treatment up to the approximate limit where the combined effect tends to no longer selectively remove iron compounds without undue solution of aluminum compounds. This point cannot always be defined accurately with respect to chemical composition of the acid treated clay, for the optimum point varies with the source of the raw bentonites. For many if not most raw bentonites, however, this point is reached when the weight ratio of $SiO_2$ to $Al_2O_3$ of the treated clay lies in the range of about 25 to 5%. It is preferred, however, to employ less drastic acid treatments short of the designated limits. Acid treatments of clay such as for instance are described in U. S. Patents 1,397,113, 1,579,326, 1,642,871 are suitable. The acid pretreatment, of course, may be less severe than is required for activation, and may be sufficient only to open pores in the clay, allowing easy access of the gas or vapor employed in the process.

The untreated clay or the above described acid treated clay or a commercially obtainable acid-treated clay such as "Filtrol" or "Super Filtrol" in dry finely divided form, or after being formed into aggregate masses as for instance by granulating, molding, extruding or the like (as is practiced in forming of clay catalysts) is subjected to the gas or vapor treatment at a temperature preferably in the range of from about 1200° F. up to about the temperature which would result in rapid shrinkage or substantial incipient fusion of the clay. Since clays will vary in composition and properties including fusion temperature even when obtained from the same source, exact temperature ranges cannot be set out. It has been observed that with montmorillonite types of clay the maximum temperature may be as high as 1500° and at times 1550° F., whereas in the case of kaolin clays, even higher temperatures may be employed as above 1600° to 1650° F. Substantial improvement in the clay may be obtained at lower temperatures, as at 1000° F., but may require repeated or prolonged treatment to reduce the iron content to the desired extent and effect the desired modification. The quantity of gas or vapor employed should be at least sufficient to chemically combine with the quantity of iron present in the clay but is advantageously employed in excess.

As above indicated, the vapor or gas employed is one which reacts chemically with the iron components initially present in the clay or remaining therein after the preliminary acid treatment, if practiced, including that portion of the iron intimately associated in the lattice structure or otherwise in so-called "isomorphous" form. The reagents employed, moreover, act selectively on the iron content without affecting substantial quantities of the aluminum or silicon components of the product, as to an extent which would impair the activity of the clay product as a catalyst. Where the gaseous treating agent converts the iron components of the clay to compounds vaporizable at the treating temperature, no further treatment to remove the iron would be required. This would be the case for instance in a treatment with chlorine gas at 1200° to 1400° F. wherein the iron would be vaporized in the form of ferric chloride. In other instances, however, such as where the chlorine treatment is at lower temperatures or the reactive gas or vapor does not form volatile compounds, the iron compounds are nevertheless converted by the treatment to a more available and more readily removable form, such as iron salts, which can then be removed from the treated clay by washing with water or a solvent for the iron salts, or by treatment with a dilute acid, with or without alternate water washing. For example, the clay may be treated with $H_2S$ at 1400° F. and then washed with dilute hydrochloric acid. Instead of leaching out the converted iron compounds formed by the gas or vapor treatment, they may alternatively be removed by further treatment with another gas or vapor such as chlorine to volatilize the same. Even in instances where subsequent acid leaching is not required to remove iron, it has been found nevertheless advantageous to treat the clay with acid subsequent to the gas or vapor treatment, since more active catalysts are usually obtained in this manner.

The invention includes in addition to the preferred types of gaseous treating agents already named, other gases or vapors capable of converting iron components of the clay to simpler or more available form, such as phosgene, carbon disulfide, sulfurmonochloride, sulfonyl chloride, and sulfur vapors. As will be readily understood the more active gases or vapors will require lower temperatures than less reactive reagents for comparable severity of treatment. For example a treatment with $CS_2$ may require temperatures in the order 1300° to 1400° F. to obtain effects comparable with $H_2S$ at 1200° F.

When the clay to be treated contains components or impurities reactive to form gases or vapors of the type described, the treating reagent may be accordingly selected to react with the said component or impurities initially to form such gases or vapors in situ. For instance, if the clay contains sulfate ions or compounds, as it would if left in unwashed state after sulfuric acid treatment, the product may be then treated with hydrogen gas at the stated temperatures, forming hydrogen sulfide by the reaction with the sulfate, and in that manner accomplishing the effect of an $H_2S$ treatment. With commercial acid activated clays such as bentonites containing residual sulfate, treatment with $H_2$ gas will be found convenient. Of course, if the residual $SO_4$ is insufficient to supply the required quantity of $H_2S$, additional sulfate may be added to the clay as by further treatment with sulfuric acid or a suitable sulfate.

Although in certain known processes of hydrocarbon conversion, the catalyst can be employed in the form of finely divided particles or powders suspended in the charge stock, in other procedures as in fixed or moving catalyst bed operation, the catalyst is preferably employed in the form of larger aggregates or agglomerated masses such as pellets, tablets, coarse granules, or the like. In the latter case, the large aggregates may be formed at any stage in the production of the final catalyst, but preferably immediately subsequent to the preliminary acid treatment, if practiced. These larger masses may be formed by compressing the dry finely divided particles or powders in a pelleting machine or by previously wetting the dry, treated or untreated clay with water or other insert liquid that will bind the small particles or powder into a cake which, after drying, can be broken up into granules or fragments of desired sizes, or the wet mix can be formed into more regular shapes by molding including casting, extruding or the like. Where the described high temperature gas or vapor treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for instance one can use a raw or acid activated clay of good cohesive properties as a binder for the treated clay. It is preferred, however, to carry out the described gas or vapor treatment of the clay while in the form of granules, tablets, pellets or other agglomerate masses particularly if the final catalyst is to take the form of such larger aggregates. If the catalyst is to be employed in the hydrocarbon treating process in the form of fine particles or powders, formation of larger aggregates for the iron removal treatment is not necessary, but, if desired, larger masses can be formed and treated in accordance with the above-described procedure and subsequently ground or comminuted to the required fineness.

Although the clay catalyst prepared by the preferred procedure has already been subjected to a high temperature treatment, it is still preferred as a final step in the preparation of the catalyst, for use in hydrocarbon conversion processes, to subject the same to calcination at a temperature above 800° F. in air with or without added steam or in steam alone.

In accordance with the present invention it is made possible not only to obtain improved catalysts from hitherto employed active clays, such as montmorillonites including catalytically activated bentonites and the like, but by the herein disclosed novel processes, clays of impractical low activity or of the types which could not be brought up to practical high levels of activity by acid activation and could not hitherto be beneficially employed as catalysts in cracking or reforming of hydrocarbons, now become available for efficient use in such processes.

In the use of the catalysts according to the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Catalysts with which the invention is concerned also find use in synthesis reactions, for example, polymerization of gaseous hydrocarbons to liquid products.

In the following examples notations of catalytic activity are expressed in terms of the standard test (CAT-A method) described in "Laboratory method for determining the activity of cracking catalysts" by J. Alexander and H. G. Shimp, page R537, National Petroleum News, Technical Section, August 2, 1944. In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposit are also determined.

Example I

Filtrol clay pellets (a commercial acid activated montmorillonite) were treated with an excess of $H_2S$ at 1400° F. for two hours under air-free conditions, the apparatus and contents having been previously swept with nitrogen. The pellets turned black as a result of the treatment. An equal volume of 15% HCl was added to the treated pellets after cooling and let stand at room temperature for two hours with frequent shaking. The temperature rose initially with rapid $H_2S$ evolution and the color of the pellets noticeably faded. The acid mixture was then heated for 30 minutes on a steam bath, the temperature rising to 140° F. After decanting, fresh 15% HCl was added to the batch in equal volume and let stand for 22.5 hours, then drained and washed several times with distilled water on a filter until chloride free. The total acid employed was about 35% on clay weight. After drying in an oven at 200° F. the pellets were calcined in air at 1050° F. for two hours. The pellets were now whiter in color than the original pellets. Tested for cracking activity on a light gas oil there was produced 37.3% by volume of gasoline with 2.6% by weight of coke and 4.9% by weight of gas.

Since Filtrol clay is a successful catalyst in prominent commercial use in petroleum cracking, it was selected for comparison at various activity levels with the catalyst of Example I. The tests were made under standard CAT-A method conditions on a light East Texas gas oil with the following results:

It will be noted that although the iron and calcium compounds have been substantially diminished, the content of alumina and magnesium compounds remains comparatively unaffected. The above analysis is exemplary of preferred types of acid-activated montmorillonite clays modified in accordance with the present invention, comprising in the preferred range about 93–97% of silica and alumina (in the weight ratio of about 3½:1 to 5:1), the remaining 7–3% of the modified clay containing magnesium compounds as major component, the magnesium being present preferably in excess of calcium as to the extent of about three to four or more times that of the calcium and other minor compounds or it may generally comprise at least 75% of the ingredients other than silica and alumina, with iron below about 0.2%.

The results shown in the above table may be compared with the effect of acid-treatment of a montmorillonite clay to remove as large a proportion of the impurities as possible and yet retain reasonable catalytic activity. For example, U. S. Patent No. 2,307,795 shows that by severe acid treatment a substantial proportion of the impurities may be removed, but the patent shows also that such treatment results in a substantial change in the silica-alumina ratio of the clay. Moreover, while normal acid treatment, (e. g., 0.35 lb. sulfuric acid per pound of clay) reduces the percentage of iron in the clay, the percentage of iron is not reduced with more severe treatment (i. e., 1.40 lbs. sulfuric acid per pound of clay), which changes from 1.52% to 1.64% $Fe_2O_3$.

The characteristic temperature stability of catalysts of the present invention is significantly

| Catalyst | Calcination | Yield | | | |
|---|---|---|---|---|---|
| | | Gasoline | Coke | Gas | Grav. |
| Filtrol catalyst ($Fe_2O_3$=2.0%) | 1400° F.—10 hrs.—5% steam | 34.8 | 2.5 | 4.3 | 1.33 |
| | 1350° F.—4 hrs.—100% steam | 29.4 | 2.0 | 3.1 | 1.26 |
| Example I ($Fe_2O_3$=0.1%) | 1400° F.—10 hrs.—5% steam | 33.0 | 1.5 | 3.0 | 1.41 |
| | 1350° F.—4 hrs.—100% steam | 27.2 | 1.0 | 2.3 | 1.37 |

The marked reduction in coke (40–50% lower) and gas produced by the modified catalyst with about the same gasoline yields is of even greater significance as indicative of the catalyst behavior in connection with high coke producing charge stocks, such as heavy petroleum oils. This was borne out in actual operation cracking a heavy East Texas crude oil fraction (27.6° API) wherein compared with typical commercial clay catalyst, the modified catalyst yielded an increase in gasoline of over 10% of the gasoline recovery, with deposition of 10% less coke, and with about the same total liquid recovery.

Chemical analyses of the Filtrol clay and the modified catalyst produced therefrom are shown below (calculated to an ignited basis):

| | Filtrol, Parts by Wt. | Example I | |
|---|---|---|---|
| | | $SiO_2$ constant | Actual basis |
| $SiO_2$ | 73.9 | 73.9 | 76.7 |
| $Al_2O_3$ | 18.0 | 17.5 | 18.2 |
| $Fe_2O_3$ | 2.1 | .09 | 0.1 |
| CaO | 3.1 | .96 | 1.0 |
| MgO | 4.9 | 4.24 | 4.4 | shown by the comparatively small change in pellet density and porosity after heat treatment at 1600° F. Whereas a typical commercial clay catalyst over the temperature range of 1500–1600° F. lost 50% of its porosity (measured in volume percent) the catalyst of Example I showed no significant shrinkage and less than 15% loss in porosity. Although with other active clays of the bentonite type losses in porosity of 50% or more may be encountered under these conditions, the modified clays of the invention showed a relatively small loss in porosity. The preferred modified clays of the montmorillonite class in accordance with the invention are those which lose less than 20% difference in porosity between such clays heated for two hours at 1500° F. and heated for the same period at 1600° F. The volume percent porosity in the following table was obtained by measuring the volume of water absorbed by a pellet of measured volume, substantially in accordance with the standard ASTM method (D468–42; method A—water absorption). The catalytic activity was well retained even after being subjected to the last stated high temperature, which temperature caused rapid decline in activity of a commercial catalyst from the same source clay. The results are shown by the following tabulation:

| | Heat Treating Catalyst Temperature, °F. | | | | | | | | Activity after 1600° F. | | |
|---|---|---|---|---|---|---|---|---|---|---|---|
| | 1400 | | 1500 | | 1550 | | 1600 | | Gasoline, Vol. Per Cent | Coke, Wt. Per Cent | Gas, Wt. Per Cent |
| | p. d. | v. p. | p. d. | v. p. | p. d. | v. p. | p. d. | v. p. | | | |
| Filtrol | 1.08 | | 1.12 | 53.6 | 1.4 | 35.8 | 1.59 | 26.8 | 11.2 | 0.4 | 1.2 |
| Ex. I | 1.01 | | 1.02 | 58 | 1.05 | 55.0 | 1.14 | 50.0 | 35.3 | 1.4 | 4.1 | p. d. = pellet density; v. p. = volume per cent porosity.

The characteristic resistance of the new catalysts to sulfur and sulfides at high temperature is demonstrated by a comparison of the same with typical clay catalyst of about the same initial activity level (39).

| | Activity after sulfidation | | | |
|---|---|---|---|---|
| | Gasoline Vol. percent | Coke Wt. percent | Gas Wt. percent | Gas Grav. |
| (a) Filtrol (2.0% $Fe_2O_3$) | 22.2 | 8.0 | 8.9 | 0.58 |
| (b) Treated Filtrol (0.12% $Fe_2O_3$) | 38.7 | 2.5 | 7.9 | 1.55 |

The catalyst in (a) above was a typical commercial acid-activated clay while (b) was obtained by treating the same clay in accordance with Example I. The above sulfidation tests were made with $H_2S$ at 1000° F. for 2 hours. The results are indicative of the respective stability of the two catalysts and their behaviour when employed for cracking or reforming of sulfur bearing charge stocks (compare Example V).

Example II

The tendency towards improved gasoline/gas and gasoline/coke ratios is in many instances evident when the iron content of the clay has been reduced to the order of about .8% $Fe_2O_3$. For example, the commercial acid activated montmorillonite treated as in Example I except that the $H_2S$ treatment was carried out at 1100° F. gave a catalyst which compared favorably with the original clay catalyst, as shown by the following tabulation:

| | Per Cent $Fe_2O_3$ | Vol. Per Cent Gasoline | Wt. Per Cent Coke | Wt. Per Cent Gas | Grav. Gas |
|---|---|---|---|---|---|
| Original acid-activated clay catalyst | 2.0 | 39.9 | 3.4 | 5.9 | 1.40 |
| Example II | .77 | 39.9 | 2.7 | 5.2 | 1.49 |

Example III

An unwashed commercial acid activated sub-bentonite clay in pellet form, ($SO_4$=4.3%) was treated with hydrogen gas for two hours at 1400° F. in an apparatus freed from air. The product which turned greyish-black in color, was then leached with hydrochloric acid of 5% strength until all the dark color was removed, followed by washing and drying. On analysis it was found that the original iron content of over 2% $Fe_2O_3$ had been reduced to .34% $Fe_2O_3$. The dried clay was then calcined in air at 1050° F. for 2 hours and employed in cracking of a light gas oil under above designated standard test conditions. There was obtained a yield of 32.9% by volume gasoline with the production of 1.9% by weight of coke and 5.6% by weight of gas of 1.34 gas gravity.

Example IV

A montmorillonite clay from Pontotoc, Mississippi ($Fe_2O_3$=5.38%) was treated with sulfuric acid of 15% strength at room temperature over a period of eight hours employing an amount of acid (100% basis) equal to 60% of the dried clay. After washing and drying the product was formed into pellets of about 4 mm. cross-section.

(a) One portion of the pellets was calcined for 2 hours in air at 1050° F. Analysis of the product gave 2.88% $Fe_2O_3$.

(b) Another portion of the pellets was treated with $H_2S$ at 1400° F. for 2 hours. After cooling the pellets were leached with hydrochloric acid of 15% strength at room temperature for 24 hours, washed with water, dried and calcined in air at 1050° F. Analysis of the product gave 0.11% $Fe_2O_3$.

The activity of the catalysts produced in accordance with (a) and (b) above is compared in Example VIII.

Example V

The following example illustrates the striking degree of stability of the modified clay catalysts towards high sulfur stock. The catalyst of Example I was employed in cracking Santa Maria gas oil, a highly corrosive stock of high sulfur content, under the following operating conditions: charging 1.5 volumes of oil per volume of catalyst per hour at a temperature of about 800° F., the treatment being at atmospheric pressure, operating for 10 minutes with alternate regeneration. The following tabulation indicates the results obtained compared with commercial acid-activated clay catalyst used under the same conditions, the activity tests being on light East Texas gas oil.

| | Filtrol ($Fe_2O_3$=2%) | | | Catalyst of Ex. I ($Fe_2O_3$=.1%) | | |
|---|---|---|---|---|---|---|
| | Gasoline | Coke | Gas | Gasoline | Coke | Gas |
| Activity test on Fresh Catalyst (CAT-A) | 34.8 | 2.5 | 4.3 | 33.0 | 1.5 | 3.0 |
| Santa Maria Gas Oil: | | | | | | |
| 1st run | 32 | 10.8 | 5.5 | 28 | 6.5 | 3.3 |
| 4th run | 27 | 11.7 | 7.0 | 30 | 6.5 | 2.9 |
| 8th run | 24 | 13.7 | 6.6 | 30 | 6.4 | 3.1 |
| CAT-A Activity Test after Santa Maria Gas Oil Cracking | 18.33 | 4.9 | 5.8 | 35.0 | 1.8 | 3.5 |

Example VI

The raw clay treated in this example was a kaolin clay from Putnam County, Florida, known as "Edgar EPK" which gave the following analysis on a dry (105° C.) sand-free basis:

|   | Percent |
|---|---|
| Ignition loss | 12.9 |
| $SiO_2$ | [1] 46.6 |
| $Al_2O_3$ | [1] 38.8 |
| $Fe_2O_3$ | 1.0 |
| CaO | 0.44 |
| MgO | 0.23 |
| $TiO_2$ | 0.35 |
| Alk. metal (as oxide) | 0.52 |

[1] $SiO_2/Al_2O_3 = 1.2$.

The above clay was subjected in raw state to treatment with $H_2S$ in excess at 1500° F. for two hours. The clay became intensely black. After cooling, it was leached with an equal volume of 15% HCl over a period of 72 hours, the acid being changed 4 times. After decanting, washing and drying, the clay was calcined at 1050° F. for two hours in air. The analyzed iron content was .07% $Fe_2O_3$. The activity of the obtained catalyst is compared in the following table with the original raw clay and the same clay which received only an acid-treatment with 10% $H_2SO_4$ (.40 ratio to dry clay) for eight hours and calcined under same conditions as the compared products.

| Edgar Clay | Gasoline | Coke | Gas | Gas Grav. |
|---|---|---|---|---|
| Raw | 14.5 | 2.7 | 4.0 | 0.57 |
| Acid treated | 27.8 | 1.8 | 4.4 | 1.36 |
| $H_2S$ treated and acid leached | 40.8 | 3.1 | 10.2 | 1.46 |

Example VII

A sample of kaolin clay from Eccles property, Putnam County, Florida, was treated with an excess of chlorine gas for two hours at 1500° F. A large part of the iron was volatilized as ferric chloride. On analysis the original iron content of 1.4% $Fe_2O_3$ was found to have been reduced to .31%. The gasoline/gas and gasoline/coke ratio were decidedly improved, the coke production being substantially half of that obtained with clay from the same source calcined in air at the above temperature.

The same clay was brought to about 0.4 $Fe_2O_3$ by chlorine treatment at 1400° F. followed by acid leaching at room temperature. Tested on cracking of a light gas oil under standard conditions, there was obtained a yield of 34.7% by volume gasoline, whereas the original clay calcined in air showed a maximum activity of the order of 25-26% gasoline.

The original Eccles clay had the following analysis by weight (containing 10-20% sand): 65.8% $SiO_2$, 32.4% $Al_2O_3$, 1.4% $Fe_2O_3$, 0.23% CaO, 21% MgO, .69% $TiO_2$.

Example VIII

Other typical examples of increase in gasoline yields as well as lowered coke after removal of iron by the described methods are illustrated by the following comparisons:

|   | Gasoline | Coke | Gas |
|---|---|---|---|
| Commercial acid activated Milwhite clay (a Texas montmorillonite) $Fe_2O_3=5.1$ | 42.4 | 6.4 | 12.1 |
| Above clay modified $Fe_2O_3=.15\%$ | 44.0 | 4.5 | 9.7 |
| Bentonite clay from Pontatoc, Miss., activated with $H_2SO_4$ (Example IVa) $Fe_2O_3=2.88\%$ | 34.1 | 4.1 | 7.3 |
| Above clay modified (Example IVb) $Fe_2O_3=.11\%$ | 41.4 | 3.4 | 8.9 |
| Raw kaolinite clay from Huron, Indiana, $Fe_2O_3=.95\%$ | 13.2 | 7.4 | 6.3 |
| Above clay modified $Fe_2O_3=.11\%$ | 39.5 | 3.4 | 10 |

Example IX

A 60-88% fraction from East Texas crude oil (27.6 A. P. I.) was cracked in a fixed bed unit with a pelleted clay catalyst prepared in accordance with Example I (.12% $Fe_2O_3$) under the following conditions: at a temperature of about 830° F. and pressure of five to ten pounds per square inch gauge, space rate of approximately 1, with 9 to 15% by weight steam added to the charge, ten minute on stream period followed by regeneration.

The above operation was repeated under substantially identical conditions except that the temperature was raised to 850° F. The yields obtained are tabulated below:

|   | 830° F. | 850° F. |
|---|---|---|
| $C_5$+motor gasoline, 365° @ 90%, vol. percent | 45.0 | 46.3 |
| Cycle stock, vol. percent | 46.4 | 41.6 |
| $C_5$+liquid recovery, vol. percent | 91.4 | 87.9 |
| $C_4$ and lighter gas, wt. percent | 10.4 | 14.0 |
| Coke, wt. percent | 4.5 | 4.5 |
| 10# motor gasoline octanes: |  |  |
| CFR-MM (clear) | 80.5 | 80.2 |
| CFR-R (clear) | 89.0 | 89.9 |

Obviously many modifications and variations of the invention as hereinbefore set forth may be made without departing from the spirit and scope thereof and therefore only such limitations should be imposed as are indicated in the appended claims.

We claim as our invention:

1. The method of converting hydrocarbon oil to gasoline hydrocarbons of improved value as motor fuel which comprises subjecting the hydrocarbon oil under catalytic cracking conditions to contact with a clay catalyst prepared by subjecting an acid treated montmorillonite clay to treatment at a temperature of at least 1200° F. with a chemically reactant gas capable of forming salts with iron and to an extent sufficient to convert the major portion of the iron content of the clay to iron salts, followed by removal of said iron salts, the total content of iron compounds in the catalyst corresponding to less than .4% $Fe_2O_3$.

2. The method of producing gasoline from hydrocarbon oils heavier than gasoline which comprises subjecting the heavier oils under catalytic cracking conditions to contact with a clay catalyst prepared by subjecting an acid treated montmorillonite clay to treatment at a temperature of at least 1200° F. with a chemically reactant gas capable of forming salts with iron and to an extent sufficient to convert the major portion of the iron content of the clay to iron salts, followed by removal of said iron salts, the total content of iron compounds in the catalyst corresponding to less than .3% $Fe_2O_3$.

3. The method of cracking corrosive petroleum oil heavier than gasoline which comprises subjecting the corrosive oil under catalytic cracking conditions to contact with a clay catalyst prepared by subjecting an acid treated montmorillonite clay to treatment at a temperature of at least 1200° F. with a chemically reactant gas capable of forming salts with iron and to an extent sufficient to convert the major portion of the iron content of the clay to iron salts, followed by removal of said iron salts, the total content of iron compounds in the catalyst corresponding to less than .2% $Fe_2O_3$.

4. The method of converting hydrocarbon oil to gasoline hydrocarbons of improved value as motor fuel which comprises subjecting the hydrocarbon oil under catalytic cracking conditions to contact with a modified clay catalyst containing a total of iron compounds corresponding to less than 0.4% $Fe_2O_3$, said catalyst being prepared by a process comprising acid treating an acid activatable montmorillonite clay containing combined iron, subjecting the resulting acid treated clay in dry condition to the action of hydrogen sulfide at a temperature of at least 1200° F., and leaching the resulting sulfided clay under mild acid conditions.

5. A method in accordance with claim 4 in which the silica-alumina ratio of said modified clay catalyst is substantially the same as the silica-alumina ratio of said resulting acid treated clay subjected to the action of hydrogen sulfide.

6. In methods of catalytically converting hydrocarbons at elevated temperature employing clay catalysts, the improvement comprising contacting the hydrocarbons at said elevated temperature with a catalyst which is acid activated montmorillonite clay which has been further treated with a sulfiding gas at not less than 1200° F. but below temperatures causing substantial incipient fusion of the clay, to convert iron present therein to iron sulfide, followed by treatment of the sulfided clay with acid under mild conditions effective to remove said iron sulfide.

7. The method of converting hydrocarbon oil to gasoline hydrocarbons of improved value as motor fuel which comprises subjecting the hydrocarbon oil under catalytic cracking conditions to contact with a modified clay catalyst prepared by a process comprising acid treating an acid activatable montmorillonite clay containing combined iron, subjecting the resulting acid treated clay in dry condition at a temperature of at least 1200° F. to the action of a gas reactable with iron at said temperatures to form iron salts, to convert iron in said resulting acid treated clay to iron salts, and leaching the resulting clay material with dilute mineral acid at substantially room temperature.

8. A method according to claim 7 in which the total iron content of the catalyst does not exceed that corresponding to .2% $Fe_2O_3$.

9. The method of converting hydrocarbon oil to gasoline hydrocarbons of improved value as motor fuel which comprises subjecting the hydrocarbon oil under catalytic cracking conditions to contact with a modified clay catalyst containing a total of iron compounds corresponding to less than .4% $Fe_2O_3$, said catalyst being prepared by a process comprising acid treating an acid activatable montmorillonite clay containing combined iron, subjecting the resulting acid treated clay in dry condition to the action of a sulfiding gas at a temperature of at least 1200° F. to convert iron in said clay to iron sulfide, and leaching the resulting sulfided clay under mild acid conditions.

10. A method in accordance with claim 9 in which the sulfiding gas is carbon disulfide.

11. A method in accordance with claim 9 in which the sulfiding gas is hydrogen sulfide.

12. In methods of catalytically converting hydrocarbons at elevated temperature employing clay catalysts, the improvement wherein the catalyst employed comprises an acid activated montmorillonite clay from which at least a portion of the iron remaining after acid activation has been removed by treatment including contact with a gas reactable with iron at elevated temperatures, said treatment comprising subjecting said acid activated montmorillonite clay to contact with said gas at not less than 1100° F. to convert iron in said acid activated montmorillonite clay to iron salts, and leaching iron salts from the resulting treated clay.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 1,727,441 | Parentani | Sept. 10, 1929 |
| 2,129,693 | Houdry | Sept. 13, 1938 |
| 2,174,610 | Weir | Oct. 3, 1939 |
| 2,300,878 | Drennan et al. | Nov. 3, 1942 |
| 2,307,795 | Kearby | Jan. 12, 1943 |
| 2,322,624 | Thomas | June 22, 1943 |
| 2,366,217 | Ruthruff | Jan. 2, 1945 |
| 2,388,302 | Weyl | Nov. 6, 1945 |
| 2,410,436 | Ewing | Nov. 5, 1946 |

Certificate of Correction

April 5, 1949.

Patent No. 2,466,050.

HUBERT A. SHABAKER ET AL.

It is hereby certified that errors appear in the printed specification of the above numbered patent requiring correction as follows:

Column 4, line 26, for the word "progressively" read *progressive*; column 13, line 70, Example VII, for "21%" read *.21%*; column 14, Example VIII, in the table, fourth column, last two lines thereof, for $$\frac{``6.3"}{10} \quad \text{read} \quad \frac{6.8}{10.3}$$

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*